(12) United States Patent
Hayano et al.

(10) Patent No.: US 8,428,092 B2
(45) Date of Patent: Apr. 23, 2013

(54) HIGH-POWER LASER UNIT WHEREIN LASER OUTPUT CAN BE ACCURATELY CORRECTED

(75) Inventors: Koji Hayano, Yamanashi (JP); Atsushi Mori, Yamanashi (JP); Yuji Nishikawa, Yamanashi (JP)

(73) Assignee: Fanuc Corporation (JP)

( * ) Notice: Subject to any disclaimer, the term of this patent is extended or adjusted under 35 U.S.C. 154(b) by 0 days.

(21) Appl. No.: 13/308,753

(22) Filed: Dec. 1, 2011

(65) Prior Publication Data

US 2012/0213238 A1 Aug. 23, 2012

(30) Foreign Application Priority Data

Feb. 17, 2011 (JP) ................................ 2011-032129

(51) Int. Cl.
*H01S 3/00* (2006.01)

(52) U.S. Cl.
USPC .................. 372/38.02; 372/38.01; 372/38.04; 372/38.07

(58) Field of Classification Search .. 372/29.01–29.012, 372/29.014–29.015, 29.02–29.021, 38.02, 372/38.04

See application file for complete search history.

(56) References Cited

U.S. PATENT DOCUMENTS

2005/0111504 A1* 5/2005 Nishikawa et al. ........ 372/38.01
2005/0195867 A1* 9/2005 Egawa et al. ................... 372/33

FOREIGN PATENT DOCUMENTS

| JP | 61-209790 | 9/1986 |
| JP | 05206554 | 8/1993 |
| JP | 06-061565 A | 3/1994 |
| JP | 08-168891 | 7/1996 |
| JP | 09-107146 A | 4/1997 |
| JP | 2005-251855 A | 9/2005 |
| JP | 2008-262976 | 10/2008 |

* cited by examiner

*Primary Examiner* — Jessica Stultz
*Assistant Examiner* — Phillip Nguyen
(74) *Attorney, Agent, or Firm* — Lowe Hauptman Ham & Berner, LLP (57) ABSTRACT

A high-power laser unit capable of accurately correcting laser output from low to rated outputs, even when the laser unit has a laser power monitor which may be affected by environmental factors inside or outside the laser unit, by effectively reducing environmental factors. The laser unit has a laser power monitor for measuring laser output, and a laser controller for correcting the laser output by correcting an amount of excitation energy to a laser power supply so that a measurement value coincides with a laser output command value. The laser unit has a laser output commanding part for generating a laser output command. When it is not necessary to correct the laser output command, the laser output command is converted into an excitation energy command value and sent to the power supply. Otherwise, an output correcting part of the laser controller corrects the laser output command.

3 Claims, 5 Drawing Sheets

HIGH-POWER LASER UNIT WHEREIN LASER OUTPUT CAN BE ACCURATELY CORRECTED

RELATED APPLICATIONS

The present application is based on, and claims priority from, Japanese Application Number 2011-032129, filed Feb. 17, 2011, the disclosure of which is hereby incorporated by reference herein in its entirety.

BACKGROUND OF THE INVENTION

1. Field of the Invention

The present invention relates to a laser unit, in particular, a high-power laser unit wherein laser output can be accurately corrected.

2. Description of the Related Art

In a laser unit used for laser processing or the like, it is often necessary that laser output be corrected in order to obtain desired processing performance. For example, Japanese Unexamined Patent Publication (Kokai) No. 2005-251855 discloses a laser unit, wherein a laser oscillator is warmed-up or cooled-down so that a measured temperature of a certain site of the laser oscillator or a laser application unit is within a constant temperature range, and then a correction coefficient for correcting a laser output command value is determined.

Japanese Unexamined Patent Publication (Kokai) No. 9-107146 discloses a laser output control device configured to randomly transmit a plurality of voltage commands at different levels to a laser power supply before actual laser operation, whereby a data table, representing the relationship between a voltage command value or a current command value and an energy value of a laser beam, is generated. In the actual laser operation, the control device extracts the command voltage or command current value from the data table, corresponding to an output command value, and transmits the extracted value to the laser power supply.

Further, Japanese Unexamined Patent Publication (Kokai) No. 6-61565 discloses a technique for stabilizing laser output by correcting a deviation in laser energy relative to a target energy value immediately after the initiation of laser oscillation. In the technique, information, relating to laser beam energy and laser excitation intensity of at least the start of each continuous oscillating operation, is stored in a storing means, and the stored information, relating to the laser beam energy and the laser excitation intensity at the start of the previous continuous oscillating operation, is used to determine the laser excitation intensity at the start of the next continuous oscillating operation.

As a method for obtaining laser output corresponding to a command value in the laser unit, a method using feedback control is known. However, the feedback control requires a measurement means, such as a laser power monitor, which can rapidly and correctly measure the laser output. Since laser power monitors are expensive and may be unreliable depending on a wavelength band of the laser, a power monitor having a long measurement cycle may be necessary. In such a case, feedback control with high accuracy cannot be performed. Therefore, in many cases, open-loop control or feedforward control is combined with feedback control so as to obtain a laser output corresponding to a command value. When open-control or feedforward control is combined with feedback control, laser output must be corrected so as to determine a coefficient for previously predicting actual laser output relative to command output.

In addition, since the laser unit is designed to output rated power, a ratio of fluctuation to laser output is considerably large when the laser output is low. Similarly, since the laser power monitor is designed to accurately measure the rated power, a measurement error is relatively large at the low laser power. Further, since the magnitudes of the fluctuation and the measurement error depend on an environmental factor inside or outside the laser unit, it is difficult to accurately correct the laser output.

Furthermore, since the laser and the laser power monitor are affected by various factors, the low laser output and the measurement thereof depend on temperature history before the measurement. In other words, even when a temperature measurement result of some points inside or outside the laser unit and/or the laser power monitor coincides with another temperature measurement result, two measurement results of laser output do not always coincide with each other.

SUMMARY OF THE INVENTION

An object of the present invention is to provide a high-power laser unit capable of accurately correcting laser output from low to rated outputs, even when the laser unit has a laser power monitor which may be affected by environmental factors inside or outside the laser unit, by effectively reducing environmental factors.

Accordingly, the invention provides a laser unit comprising: a laser output commanding part configured to generate a laser output command based on a predetermined program or a user input; an excitation energy commanding part configured to generate an excitation energy command transmitted to a laser power supply based on the laser output command; a laser power monitor configured to measure laser output obtained by excitation energy which is output by the laser power supply; an output correcting part configured to determine a correction coefficient for correcting command output included in the laser output command so that the command output coincides with laser output measured by the laser power monitor; a preliminary laser outputting part configured to carry out a preliminary laser output for a predetermined duration time on one or more preset laser output condition, wherein a preliminary laser output command for the preliminary laser output is different from a laser output command for determining the correction coefficient; and a correction laser outputting part configured to output a correction laser output for a duration time, after the preliminary laser output, on a laser output condition for determining the correction coefficient, wherein the output correcting part determines the correction coefficient based on a measurement result of the preliminary laser output and the correction laser output.

In a preferred embodiment, the laser output of the preliminary laser outputting part is based on a plurality of laser output commands including different output values, wherein the plurality of laser output commands includes a command for sequentially outputting the laser from a high laser output to a low laser output.

In a preferred embodiment, the output correcting part corrects the laser output command based on a measurement result of the laser output on a plurality of laser output command conditions, and wherein the output correcting part corrects the command output so that laser output measured by the laser power monitor coincides with the command output, only when the laser output command condition is lower than a predetermined value.

In a preferred embodiment, the output correcting part corrects the laser output command based on a measurement result of the laser output on a plurality of laser output command conditions, and wherein the lowest laser output command condition is calculated based on a measurement result of the laser output of the other laser output command conditions.

In a preferred embodiment, the output correcting part corrects the laser output command based on a measurement result of the laser output on a plurality of laser output command conditions, and wherein the lowest laser output command condition is calculated based on a measurement result of the laser output of the other laser output command conditions and a measurement result of a past corrected laser output which is previously stored.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 6b is a partial enlarged view of FIG. 6a;

DETAILED DESCRIPTIONS

Figure 1:
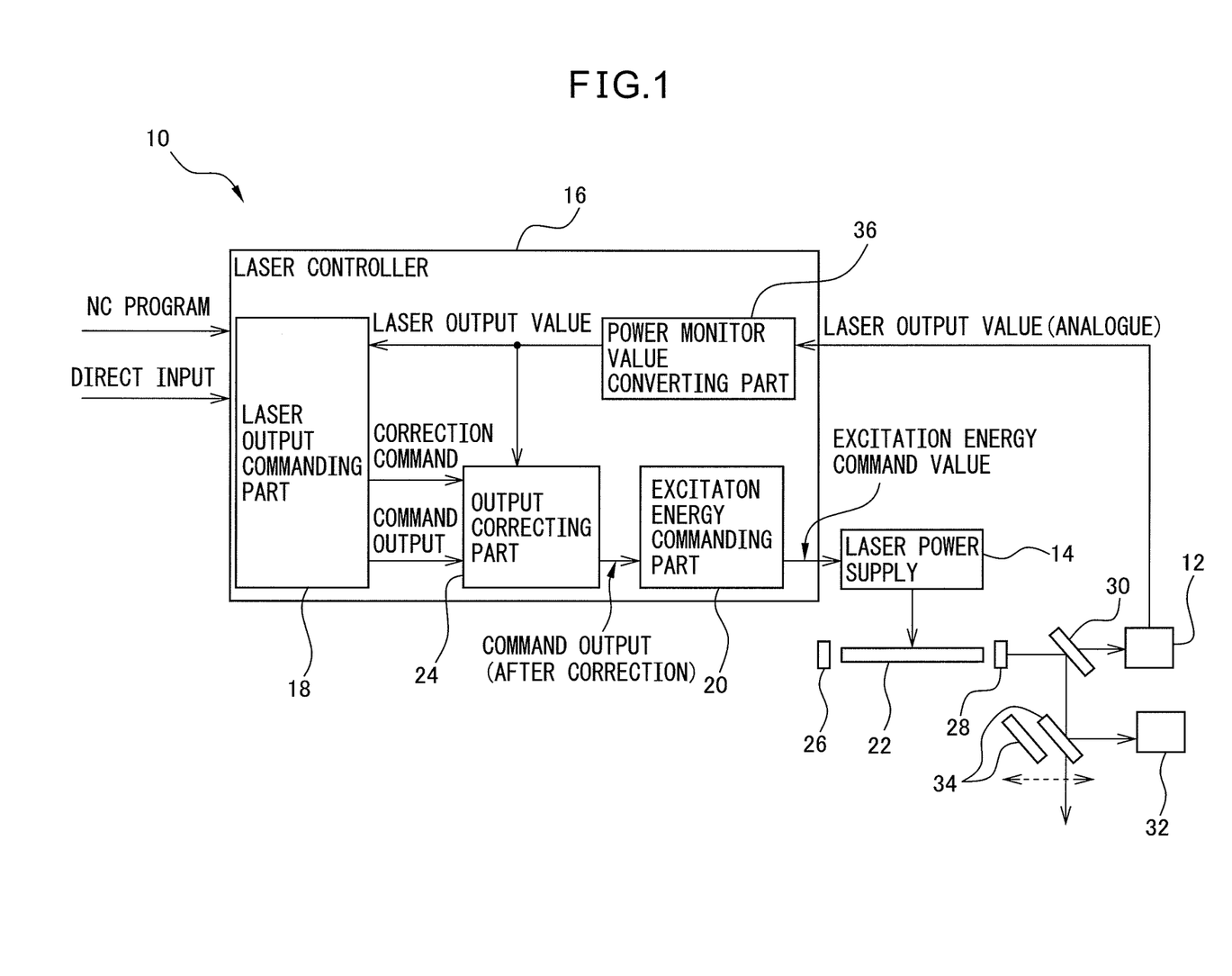
FIG. 1 shows a schematic configuration of a laser unit according to a first embodiment of the present invention.

FIG. 1 shows a schematic configuration of a laser unit according to the invention. Laser unit 10 includes a laser power monitor 12 configured to measure laser output, and a laser controller 16 having a function for correcting the laser output by correcting an amount of excitation energy to a laser power supply 14 so that a measurement value of the laser output measured by laser power monitor 12 coincides with a laser output command value.

Laser controller 16 has a laser output commanding part 18 configured to generate a laser output command based on a predetermined program such as an NC program, or a direct input by a user. The laser output command is converted into an excitation energy command value, such as power, voltage or amount of light, at an excitation energy commanding part 20, when it is not necessary to correct the laser output command, for example when starting of production. Then, the converted command is transmitted to laser power supply 14. Laser power supply 14 applies energy, such as discharged or excited light, to a laser medium such as laser gas within a discharge tube 22, according to the excitation energy command value, so as to generate laser oscillation. On the other hand, when it is necessary to correct the laser output command, an output correcting part 24 of laser controller 16 corrects the laser output command, as explained below.

A rear mirror (total reflection mirror) 26 is positioned at one end of discharge tube 22, and an output mirror (semi-transparent mirror) 28 is positioned at the other end of discharge tube 22. Discharge tube 22 and these mirrors cooperatively constitute a laser resonator. When high-frequency voltage is supplied to discharge tube 22, the laser gas within the discharge tube is excited by discharging and light is generated at the resonator. The generated light is repeatedly reflected between mirrors 26 and 28 and amplified by induced emission. A part of the amplified light is outputted from output mirror 28 as a laser beam.

A part of the laser beam output from mirror 28 transmits a semitransparent mirror 30 positioned on a light path of the laser beam, and then is measured by laser power monitor 12. A ratio of an amount of energy used for measurement in laser power monitor 12 relative to an amount of energy of the output laser beam is about 0.1% to 0.5%. The laser beam reflected by semitransparent mirror 30 is output outside of the oscillator and used for various applications. However, a shutter 34 may be arranged to block the laser beam or reflect the laser beam toward a beam absorber 34, whereby the laser beam cannot be leak out outside of the oscillator. In addition, rear mirror 26 may be constituted as a semitransparent mirror, and laser power monitor 12 may be positioned at a side of mirror 26 opposed to discharge tube 22.

When the laser power measurement value from laser power monitor 12 is an analog value, laser controller 16 has a power monitor value converting part (converter) 36 configured to convert the measurement value to a digital signal. Power monitor value converter 36 converts the output value (analog signal) from laser power monitor 12 into the digital signal (A/D conversion), adjusts a zero point thereof, and multiplies the digital signal by a predetermined magnification, so that laser controller 16 can use the digital signal as an accurate laser output value.

Figure 2:
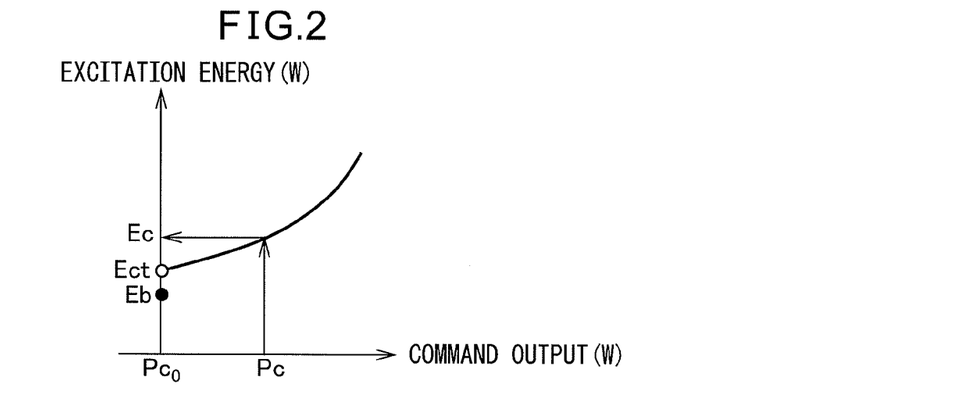
FIG. 2 shows a graph indicating a relationship between command output and excitation energy.
Figure 3:
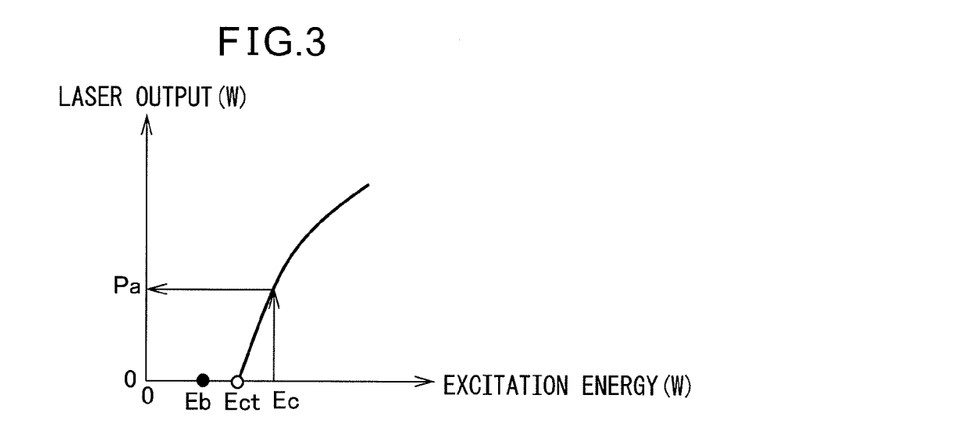
FIG. 3 shows a graph indicating a relationship between excitation energy and a laser output.
Figure 4:
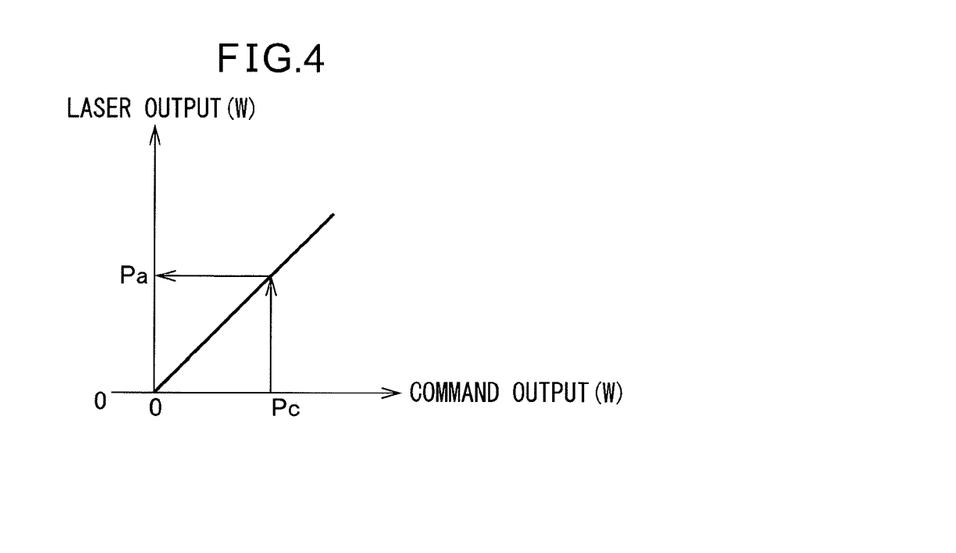
FIG. 4 shows a graph indicating a relationship between command output and laser output.

Next, the relationship between command output included in the output command, excitation energy and laser output are explained with reference to FIGS. 2 to 4. As shown by a curved conversion function of FIG. 2, when command output is given, excitation energy commanding part 20 calculates an amount of excitation energy corresponding to the command output. As shown in FIG. 3 indicating a laser output characteristic, when the excitation energy is given by laser power supply 14, laser output corresponding to the excitation energy is obtained. In this regard, when the curved conversion function of FIG. 2 is an inverse function of the laser output characteristic of FIG. 3, a preferred laser output, which is proportional to the command output, is obtained as shown in FIG. 4. However, the laser characteristic of FIG. 3 is typically varied due to an environment of the laser unit and/or aged deterioration of components of the laser unit.

Some methods may be used for dealing with the variance of the laser characteristic, and one method to use feedback control. However, the feedback control requires a laser power monitor capable of rapidly and accurately measuring the laser power, and such a power monitor is expensive depending on a wavelength band of the laser, and sometimes unreliable. Therefore, a power monitor having a long measurement cycle may be necessary. However, feedback control with high accuracy cannot be performed in this case, and thus open-loop control or feedforward control is usually combined with feedback control so as to obtain laser output corresponding to the command output. When open-control or feedforward control is combined with feedback control, the accuracy of the laser output may be improved by timely correcting the functions as shown in FIGS. 2 to 4.

Figure 5:
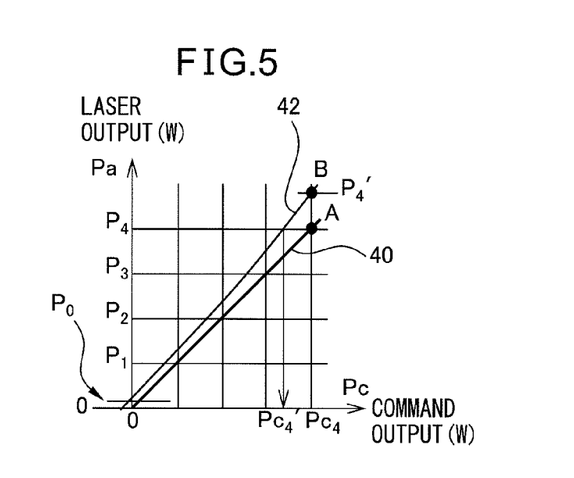
FIG. 5 shows a graph indicating a relationship between command output and laser output, wherein an example of correction of the laser output is explained.

For example, it is supposed that the relationship between the command output and the laser output of FIG. 4 is varied, i.e., a characteristic curve 40 is changed to a characteristic curve 42 as shown in FIG. 5. In this case, when command output corresponding to a point $Pc_4$ is given, instead of laser output $P_4$ (a point "A" of curve 40), laser output $P_4'$ (a point "B" of curve 42) larger than $P_4$ is obtained. Thus, output $P_4$ or a near output may be obtained when the command output is set to $Pc_4'$, wherein $Pc_4'$ is calculated by multiplying $Pc_4$ by a ratio of the laser outputs of points "A" and "B" (i.e., $P_4/P_4'$).

When the number of the points used for correction as explained above is increased (for example, four ($P_1$ to $P_4$)), more accurate laser output may be obtained. In addition, the correction at a point $P_0$, where the laser output is equal to or near zero, may improve the accuracy of a very low laser output.

Figure 6A:
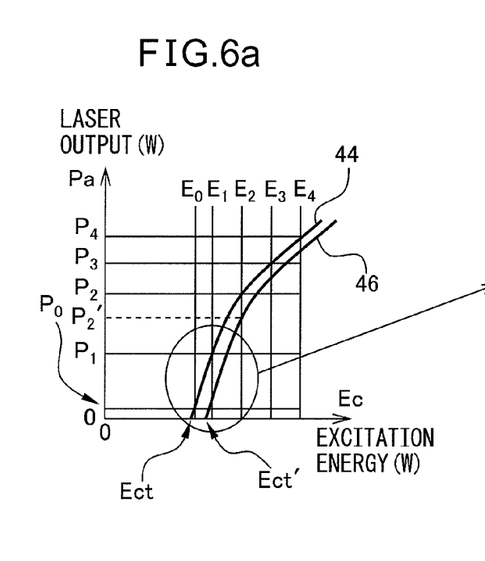
FIG. 6a shows a graph indicating a relationship between excitation energy and laser output, wherein an example of correction of the laser output is explained.

When the characteristic curve of FIG. 3 indicating the relationship between the excitation energy and the laser output is corrected, it is possible to match the laser output with the laser output command value (Pc=Pa) as shown in FIG. 4, since the curve of FIG. 2 indicating the relationship between the command output and the excitation energy is a reverse function of the curve of FIG. 3. A concrete example of this is explained by FIGS. 6a and 6b. In FIG. 6a, a characteristic curve 44 is changed to a curve 46, and then laser outputs $P_1$ to $P_4$, corresponding to supplied excitation energy values $E_1$ to $E_4$, respectively, are varied. In this regard, by measuring laser outputs corresponding to excitation energy values $E_1$ to $E_4$ prior to the operation of the laser unit, and by correcting the supplied excitation energy, based on the measured outputs, corresponding to the laser outputs which are obtained according to the normal characteristic indicated by curve 44, the laser output in the operation of the laser unit may generally coincide with the output command value.

Figure 6B:
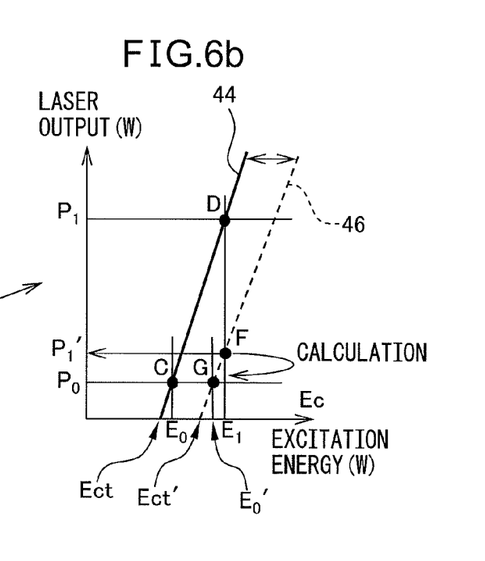

In the characteristic curve of FIGS. 6a and 6b, when the laser output is corrected, it is effective to previously calculate the supplied excitation energy value (for example, $E_0$), corresponding to laser output $P_0$ which is close to an oscillation threshold, in order to obtain very low and accurate laser output. Regarding a formula for the correction, when original characteristic curve 44 is represented by equation (1), characteristic curve 46 after the correction can be calculated by equation (2) below.

$$Pa = f(Ec) + Ect \quad (1)$$

$$Pa = k \times f(Ec) + Ect' \quad (2)$$

In the above equations, "f" is a function for calculating Pa from Ec, and the function may be determined by interpolation using one or more parameter stored as an output characteristic table in the excitation energy commanding part. As shown, Ect is an excitation energy command value (Ec) which corresponds to the oscillation threshold, and "k" is a correction coefficient. When the correction is carried out based on a plurality of laser outputs, a plurality of correction coefficients such as k12, k23, . . . may be used corresponding to respective laser outputs.

In some cases, it is difficult to accurately calculate Ect and/or Ect'. Therefore, original characteristic curve 44 may be represented by equation (3), and characteristic curve 46 after the correction may be calculated by equation (4) below.

$$Pa = f(Ec) \quad (3)$$

$$Pa = k \times f(Ec) + \Delta Ect \quad (4)$$

$\Delta Ect$ may be calculated by equation (5) below. As shown in FIG. 6b which is an partial enlarged view in the vicinity of the oscillation threshold of FIG. 6a, $\Delta Ect$ can be approximated by ($E_0'-E_0$). Therefore, equation (4) may be modified to more practical equation (6). As such, $\Delta Ect$ may be considered to be one correction coefficient.

$$\Delta Ect = Ect' - Ect \quad (5)$$

$$Pa = k \times f(Ec) + (E_0' - E_0) \quad (6)$$

As explained above, it is very effective to correct the laser output corresponding to the change in the characteristic of the laser output. This correction is equivalent to: calculating a correction coefficient regarding supplied excitation energy or a output command value in control without using feedback; determining a coefficient for increasing/decreasing an amount of feedforward in feedback control combined with feedforward; or determining a value for calculating a preset value applied to an integrator based on command output in PI control.

The operation for calculating or determining the correction coefficient as explained above (hereinafter, referred to as "coefficient determining operation") is carried out as a preliminary operation, for example, prior to laser machining by operating the laser unit. Hereinafter, the procedure of the coefficient determining operation in the laser unit of FIG. 1 will be explained.

In FIG. 1, when a laser beam should be output by operating laser unit 10, shutter 34 is opened to output the laser beam outside. On the other hand, when the coefficient determining operation is carried out, shutter 34 is closed so that the laser beam is output toward beam absorber 32 without outputting outside. Beam absorber 32 absorbs nearly 100% of the laser beam and converts the absorbed laser beam into heat.

Laser output commanding part 18 generates the output command including a command output value, and simultaneously outputs a correction command to output correcting part 24. The correction command contains some kinds of signals, e.g., a signal for correcting the command output in the operation wherein laser unit 10 output the laser beam outside and for calculating the command output for excitation energy commanding part 20 by using the correction coefficient; and a signal for commanding execution of the coefficient determining operation. Further, laser output commanding part 18 may generate a command for carrying out a correction laser output (laser output for correction) or a preliminary laser output as explained below.

The coefficient determining operation may be executed according to the below procedure, for example.

First, due to a direct input by an operator or an instruction of a previously prepared NC program, a sequence for determining a correction coefficient for correcting the laser output is initiated. Laser output commanding part 18 outputs an output command including a predetermined command output value to output commanding part 24, and simultaneously outputs a correction command for determining the correction coefficient to output correcting part 24. Output correcting part 24 send an output command including a command output value to excitation energy commanding part 20 for a given time, according to the command from laser output commanding part 18, until the laser output becomes stable or the fluctuation of the laser output becomes sufficiently small. This command output is not multiplied by the correction coefficient, unlike the normal operation.

Excitation energy commanding part 20 outputs an excitation energy command value to laser power supply 14, corresponding to the command output from output correcting part 24. Then, laser power supply 14 supplies energy to the laser medium between output mirror 28 and rear mirror 26. The laser medium excited by the supplied energy starts to emit light, and the light is resonated and amplified between mirrors 26 and 28, whereby the laser beam is output from output mirror 28 which is a semitransparent mirror. The output laser is measured by power monitor 12, and a measured laser output value is compared to the command output in output correcting part 24. When the laser output coincides with the command output, the correction coefficient is set to one. Otherwise, the correction coefficient is calculated according to formulas stored in output correcting part 24.

The calculated correction coefficient is stored in output correcting part 24. As explained above, the number of correction coefficient is not limited to one, thus a plurality of correction coefficients may be prepared corresponding to a plurality of laser output values. During this operation, shutter 34 is closed and the laser beam is absorbed by beam absorber 34, whereby the laser beam does not leak outside.

Next, when laser machining or the like is carried out by operating laser unit 10, laser output commanding part 18 send to output correcting part 24 a command for calculating the command output by using the correction coefficient to output correcting part 24, as well as the output command. Output correcting part 24 send to excitation energy commanding part 20 the command output and a result of calculation based on the correction coefficient. By virtue of this, the laser output value generally coincides with the command output.

When the correction is carried out based on the plurality of laser outputs, in relation to command output other than outputs used for correction, a correction coefficient is determined by interpolation. As such, any command output may be properly determined.

Figure 7:
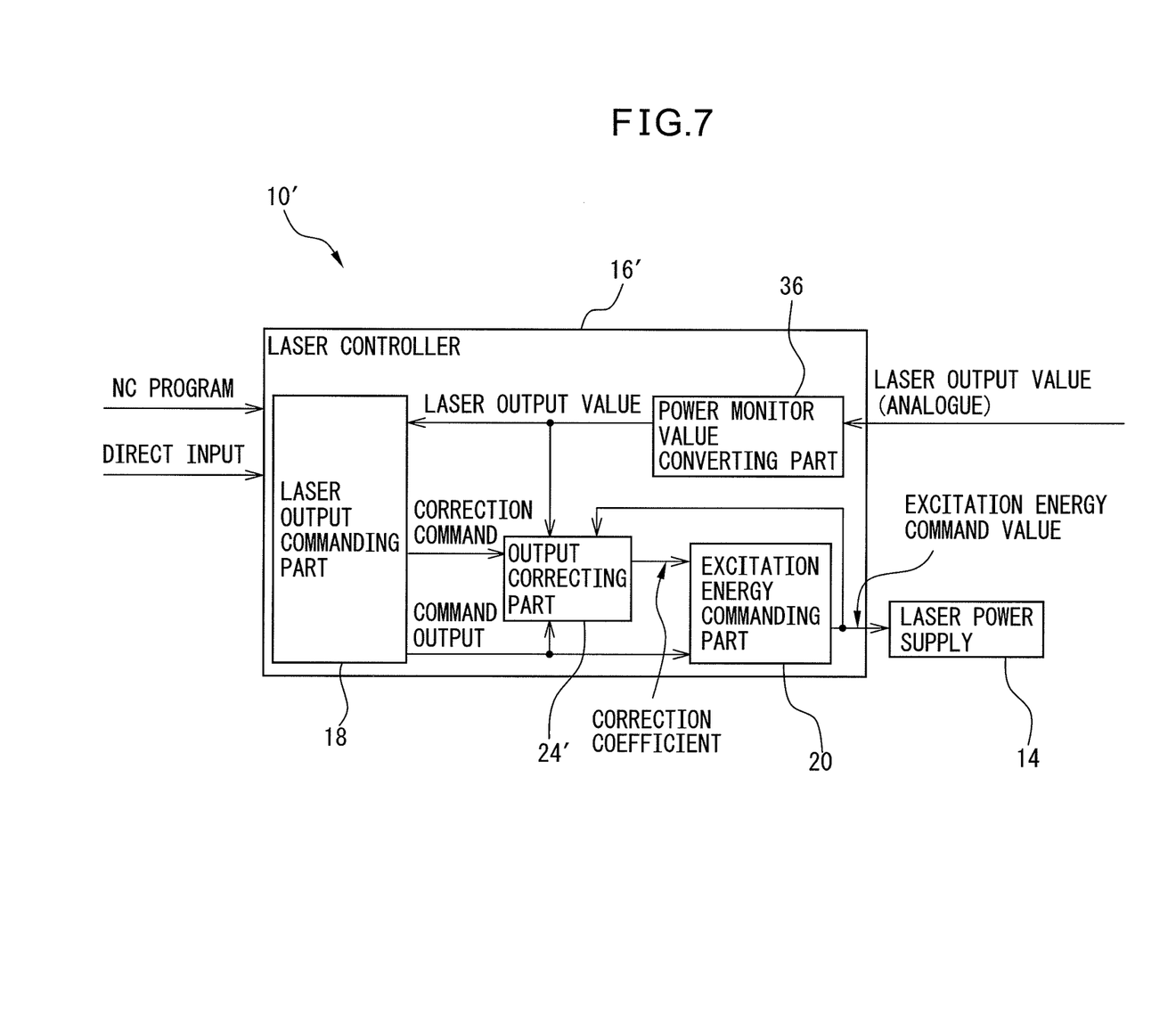
FIG. 7 shows a schematic configuration of a laser unit according to a second embodiment of the present invention.

FIG. 7 is a diagram showing a laser unit 10' according to a second embodiment of the invention, wherein the excitation energy command value as shown in FIGS. 6a and 6b is corrected. Each component of laser unit 10' has the same reference numeral as corresponding component of FIG. 1, and the detailed explanation thereof will be omitted. Further, the other devices such as the laser power supply and the power monitor, which are not included in laser controller 16', may be the same as those of FIG. 1, and are not shown in FIG. 7.

In laser controller 16', when the correction command for executing the coefficient determining operation is given, actual laser output values are sequentially measured corresponding to one or more excitation energy value. In fact, as the excitation energy command value is given as the command output value, in the second embodiment of FIG. 7, the correction coefficient for the excitation energy is determined by comparing the excitation energy command value to the laser output value measured by the power monitor at output correcting part 24'. When operating laser unit 10', the laser output value generally coincides with the command output by multiplying the excitation energy command value by the correction coefficient.

In the prior art, when carrying out the coefficient determining operation, after the output command condition is maintained constant for a given length of time or after an amount of change in the laser output or the temperature of the laser unit is within a given range, the laser output value used for the correction is determined. On the other hand, in the invention, the laser beam is sequentially output on laser output command conditions in a predetermined order, the command conditions being different from the laser output command for the correction. Then the laser output for the correction is carried out and the output value is measured, and the laser output is corrected based on the measured laser output value.

In addition, the laser output command conditions different from the laser output command for the correction and the output order thereof may be stored in the output correcting part or the laser output commanding part, or may be given from external component such as an NC program.

A method of the prior art is affected by an operation history of the laser unit prior to the coefficient determining operation. Concretely, the determined output correction coefficient may be affected and may have an error, depending on whether the correction coefficient is determined immediately after the laser unit is activated or not, and or a factor relating to the thermal environment inside or outside the laser unit. In particular, a considerably low laser output, close to an oscillation threshold at which the laser oscillation can occur or not, may be significantly affected by the above factor. Therefore, in the invention, the laser output is previously carried out on the laser output command condition which is different from the laser output command for determining the correction coefficient, according to a given order, whereby the output characteristic of the laser and the measurement characteristic of the power monitor may be stabilized, and the laser output may be accurately corrected even at the very low laser output close to the oscillation threshold.

Further, in the invention, the coefficient determining operation may be executed after carrying out a warm-up operation wherein the laser is output based on a high-output command and a subsequent low-output command. Generally, the laser output uses from several percent to at most 30 percent of the energy supplied to the laser unit, and the excess energy is discharged as heat. In this regard, in order to stabilize the temperature of each component of the laser unit after the laser output command is activated, it is necessary that input-heat, output-heat and internal thermal state of each component are held in equilibrium, which takes a long time. Thus, by rapidly warming-up the laser unit at the high laser output and subsequently removing the excess heat of the laser unit and the power monitor at the low laser output, the coefficient determining operation may be rapidly and accurately carried out.

Generally, a sensitive sensor such as a laser power monitor has a tendency not to accurately and stably measure the laser output or the like when the internal temperature of the laser unit is considerably high. In particular, when a very low laser output close to the oscillation threshold is to be measured, the power monitor cannot output a correct measurement value after the power monitor is cooled to a certain temperature, since the internal temperature of the laser unit is relatively high immediately after the laser oscillation at the high output is stopped. On the other hand, in relation to a component having a large volume, it takes a long time to stabilize the temperature thereof after starting-up the laser unit. Although the temperature of such a component is relatively rapidly stabilized when the laser output is high, it takes a long time for the laser unit to become a thermally steady state when the very low output close to the oscillation threshold is measured immediately after the starting-up of the laser unit. Therefore, it is very effective to carry out the coefficient determining operation once the laser unit is heated on high power and then cooled for a while. In other words, after the laser unit is rapidly warmed up on high power, the laser unit is operated on low power so as to remove the excess heat of the laser and the power monitor, whereby the laser unit becomes thermally stable. Therefore, the repeatability of a parameter such as the temperature may be improved, and the laser output may be rapidly and accurately corrected.

Figure 8:
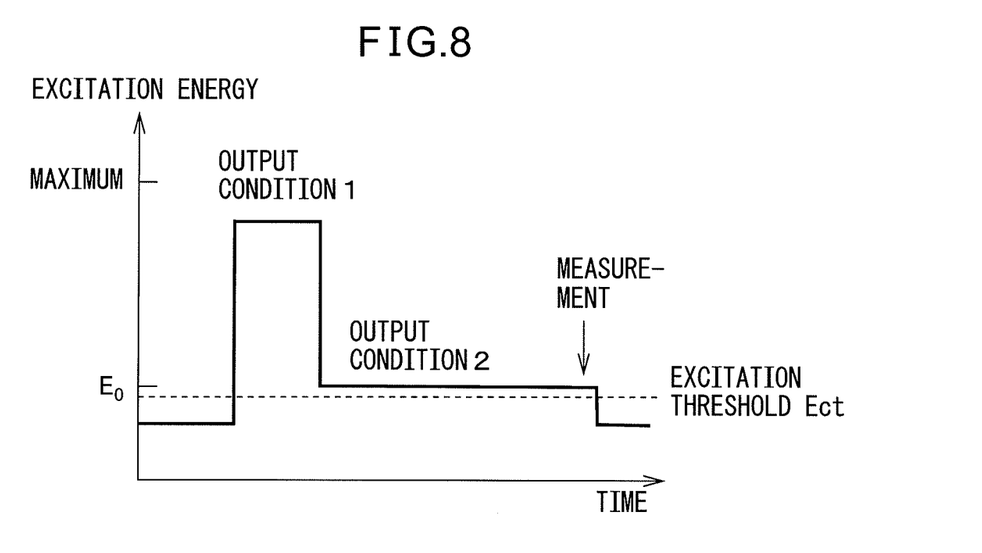
FIG. 8 shows a graph, wherein laser output operations are sequentially carried out in a predetermined sequence, based on laser output command conditions which are different from a correction laser output command, prior to carrying out a correction operation of the laser output.
Figure 9:
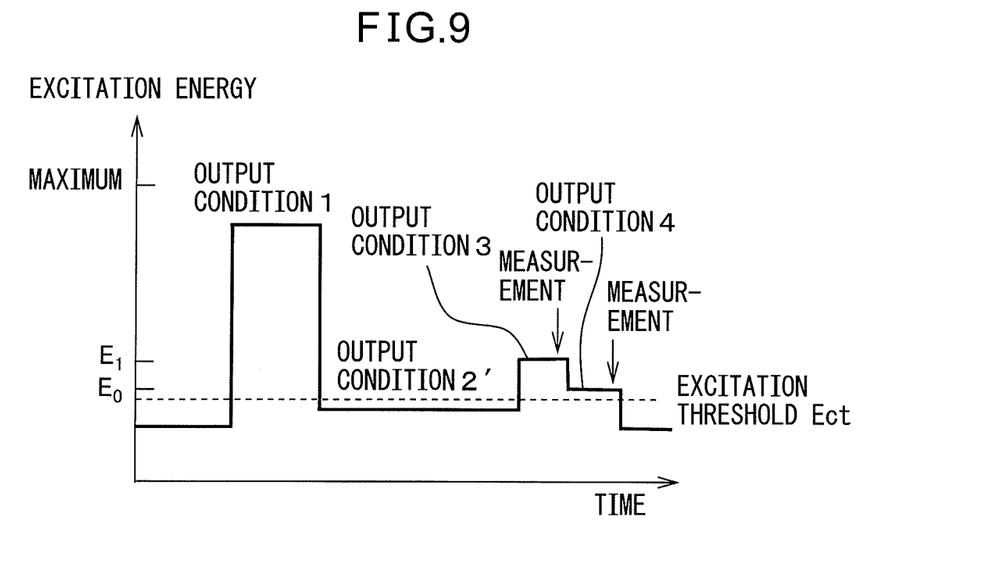
FIG. 9 shows a graph, wherein laser output operations are sequentially carried out, based on laser output command conditions which are different from the output command conditions of FIG. 8.

FIGS. 8 and 9 show an example of the above, i.e., the procedure wherein the laser output (or the preliminary laser output) is carried out for a predetermined duration time on one or more preset laser output condition at a predetermined order, the laser output being different from a laser output command for determining the correction coefficient, before carrying out the coefficient determining operation based on the correction laser output obtained by the laser output command for determining the correction coefficient.

First, FIG. 8 shows the procedure wherein the laser is previously oscillated on "output condition 1," a supplied excitation energy $E_0$ to be measured is maintained for a constant period of time (output condition 2), and then the laser output is measured to carry out the coefficient determining operation. On the other hand, FIG. 9 shows the laser is previously oscillated on "output condition 1," a supplied excitation energy slightly lower than oscillation threshold Ect is maintained for a constant period of time (output condition 2'), and then the laser output is measured on "output condition 3" and "output condition 4" which respectively designate supplied excitation energy values $E_1$ and $E_0$ larger than oscillation threshold Ect so as to carry out the coefficient determining operation.

Further, in the invention, in the laser unit wherein the laser output is corrected based on a plurality of laser output command conditions, the laser output may be corrected after the laser is output on an output command condition different from the correction laser output command condition, only when the output command condition is low. Generally, a high laser output of a high-power laser unit rapidly becomes stable, and a power monitor for the laser unit is configured to measure the high output, and thus the high laser output may be accurately corrected. However, in the high-power laser unit, in relation to the coefficient determining operation at a low laser output close to the oscillation threshold, the state of the laser is unstable and a measured value of the power monitor is likely to include an error. Then, by applying the invention to the correction only when the laser output is low, time and cost for the correcting operation may be reduced.

It is important but difficult to determine a supplied energy value for obtaining a very low laser output close to the oscillation threshold, in order to correct the very low laser output. As shown in characteristic curve 44 of FIGS. 6a and 6b, very low laser output $P_0$ close to the oscillation threshold may be obtained at supplied excitation energy $E_0$ (a point "C"). However, when the characteristic curve is changed to curve 46, the laser output corresponding to $E_0$ becomes zero. Then, the supplied excitation energy is changed so as to easily determine supplied excitation energy value Ect' corresponding to the state wherein the laser output is zero. However, it takes a very long time to carry out such a procedure by trial and error. On the other hand, the supplied excitation energy may be gradually increased or decreased to determine energy value Ect'. However, in this method, a time from starting the measurement of the laser output to obtaining the excitation energy corresponding to Ect' considerably varies, and thus the laser output cannot be measured in relation to a constant temperature history which is required in the invention.

Thus, in the invention, the laser output is measured on a plurality of laser output command conditions, and the output condition for obtaining the lowest laser output is calculated by the output measurement result of the other laser output command condition. For example, as shown in FIG. 6b, when the laser characteristic is changed from curve 44 to curve 46, the laser output is firstly measured, at the excitation energy wherein laser output $P_1$ is obtained in curve 44 (a point "D"). According to curve 46, laser output $P_1'$ is obtained (a point "F"). Similarly, as shown in FIG. 6a, laser output $P_2'$ in characteristic curve 46 is obtained, at the excitation energy wherein laser output $P_2$ is obtained in curve 44. From $P_1'$ and $P_2'$, an inclination of the laser output in curve 46, relative to the excitation energy close to the oscillation threshold, is calculated. Then, by calculating a point "G" based on point "F," excitation energy $E_0'$ corresponding to laser output $P_0$ in curve 46 may be calculated. In other words, by measuring the laser output at excitation energy $E_0'$, the laser output close to $P_0$ may be obtained in a single measurement operation, and the output correction coefficient may be accurately calculated.

Otherwise, in the invention, the output condition (for example, the excitation energy) corresponding to the lowest laser output used for the correction may be previously calculated by using data obtained when correcting the past laser output and values calculated therefrom. Generally, in FIG. 6b, it is necessary to use a plurality of measurement points for calculating the inclination of characteristic curve 44 or 46. When the characteristic is changed from curve 44 to curve 46, the inclination of the curve is also changed in a narrow sense, as well as shifting the excitation energy from Ect to Ect' (i.e., x-intercept). However, the change in the inclination does not affect the relationship between the excitation energy and the laser output in comparison to the shifting of the x-intercept, at least in a range from $P_0$ to $P_1$ (in the vicinity of the oscillation threshold).

Then, when calculating point G based on point F in characteristic curve 46 in the past coefficient determining operation, the inclination of a segment between points C and D, in characteristic curve 44 before changed, may be used for the calculation. In other words, the inclination of the past characteristic curve is stored, and then excitation energy $E_0'$ is calculated based on the inclination in the coefficient determining operation. By virtue of this, only two measurement points are necessary for the coefficient determining operation at very low laser output in the vicinity of the oscillation threshold.

In the example of FIG. 9, the laser is output according to "output condition 4" which is determined based on the laser output value measured in "output condition 3," the measurement result in the past coefficient determining operation and the calculated inclination of the characteristic curve, whereby the coefficient determining operation at very low laser output in the vicinity of the oscillation threshold may be carried out.

At very low laser output where the laser may be oscillated or not, another correction point where the laser output is high is measured, and then the laser output condition may be previously calculated so as to correct the laser output. However, when the laser output measured after the warm-up operation is not a value in the vicinity of an intended laser output, such a low laser output cannot be accurately corrected. In this case, when the laser output should be measured again, the laser output cannot be accurately measured unless the warm-up operation is carried out again. Then, in the measurement of the very low laser output, a laser output condition is predicted based on a previous measurement result of relatively high laser output, and then the laser output is corrected. By virtue of this, the low laser output can be accurately corrected in a minimum amount of time.

In the description above, the laser output condition is a continuous output condition. However, in many conventional laser units, a plurality of pulses including a frequency of approximately 1 Hz to 10 kHz are output, and then the laser is output according to a pulse waveform. In this case, a pulse frequency, a pulse duty, the number of pulses per unit time, a pulse on time and a pulse off time are added as an output condition. Instead of the laser output of several thousands watts, a physical quantity other than the laser light, such as a discharge current value and/or an amount of excitation light, may be used as the laser output condition. Further, the operational physical quantity, such as the laser output, the discharge current value and the amount of excitation light, may be represented by an equation wherein an offset item is separately designated (see $\Delta Ect$ of equation (4)), and the offset item may be further divided into a fixed component and a variable component. These operations may be included in the laser output condition. In addition, as the measurement value of the laser output, a time average of the energy, an amount of heat per one pulse or a peak value may be used.

In FIGS. 8 and 9, the excitation energy lower than the oscillation threshold is supplied before and after the correction of the output (i.e., before "output condition 1" and after "output condition 2" or "output condition 4"). This operation, which corresponds to a preliminary discharge or a simmer discharge, is carried out in many laser units, and has an effect for rapidly and stably starting-up the laser unit when the laser output command is output. In "output condition 2'" of FIG. 9, the energy slightly lower than laser oscillation threshold Ect is supplied, whereby the laser unit is effectively cooled while some components of the laser unit are prevented from being excessively cooled. Further, an output command may be executed, wherein oscillation threshold Ect or a discharge current value in the simmer discharge is changed, and then the laser output value for the correction may be measured.

According to the present invention, the laser output is previously carried out on the laser output command condition which is different from the laser output command for determining the correction coefficient, according to a given order, whereby the output characteristic of the laser and the measurement characteristic of the power monitor may be stabilized, and the laser output may be accurately corrected.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A laser unit comprising:
   a laser output commanding part configured to generate a laser output command based on a predetermined program or a user input;
   an excitation energy commanding part configured to generate an excitation energy command transmitted to a laser power supply based on the laser output command;
   a laser power monitor configured to measure laser output obtained by excitation energy which is output by the laser power supply;
   an output correcting part configured to determine a correction coefficient for correcting command output included in the laser output command so that the command output coincides with laser output measured by the laser power monitor;
   a preliminary laser outputting part configured to carry out a preliminary laser output for a predetermined duration time on plurality of preset preliminary laser output conditions, wherein a preliminary laser output command for the preliminary laser output is different from a laser output command for determining the correction coefficient; and
   a correction laser outputting part configured to output a correction laser output for a duration time, after the preliminary laser output, on a laser output condition for determining the correction coefficient,
   wherein the plurality of preliminary laser output conditions include a command for sequentially outputting the laser from a high laser output to a low laser output only when the correction laser output is lower than a predetermined value, and
   wherein the output correcting part determines the correction coefficient based on a measurement result of the correction laser output.

2. The laser unit as set forth in claim 1, wherein the output correcting part corrects the laser output command based on a measurement result of the laser output on a plurality of laser output command conditions, and wherein the lowest laser output command condition is calculated based on a measurement result of the laser output of the other laser output command conditions.

3. The laser unit as set forth in claim 1, wherein the output correcting part corrects the laser output command based on a measurement result of the laser output on a plurality of laser output command conditions, and wherein the lowest laser output command condition is calculated based on a measurement result of the laser output of the other laser output command conditions and a measurement result of a past corrected laser output which is previously stored.

* * * * *